(12) United States Patent
Aryafar et al.

(10) Patent No.: US 9,949,294 B2
(45) Date of Patent: Apr. 17, 2018

(54) CLIENT-DRIVEN DYNAMIC CHANNEL ADAPTATION IN WIRELESS NETWORKING

(71) Applicant: Intel Corporation, Santa Clara, CA (US)

(72) Inventors: Ehsan Aryafar, Kensington, CA (US); Minyoung Park, Portland, OR (US); Ping Wang, San Jose, CA (US); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 14/975,165

(22) Filed: Dec. 18, 2015

(65) Prior Publication Data
US 2017/0181190 A1 Jun. 22, 2017

(51) Int. Cl.
*H04W 74/08* (2009.01)
*H04W 74/00* (2009.01)
*H04W 84/12* (2009.01)

(52) U.S. Cl.
CPC ..... *H04W 74/0816* (2013.01); *H04W 74/004* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2005/0190782 A1* | 9/2005 | Buckley | H04W 36/12 370/437 |
| 2006/0194611 A1* | 8/2006 | Pasternak | H04B 17/20 455/553.1 |
| 2014/0307639 A1* | 10/2014 | Jung | H04W 72/042 370/329 |
| 2016/0366701 A1* | 12/2016 | Chu | H04W 74/0816 |
| 2017/0041106 A1* | 2/2017 | Srivastava | H04L 5/0007 |

OTHER PUBLICATIONS

U.S. Appl. No. 62/173,230, Chu et al. ,Jun. 9, 2015.*
"802.11ac: The Fifth Generation of Wi-Fi", Cisco: Technical White Paper, (Mar. 2014), 25 pgs.
(Continued)

*Primary Examiner* — Brandon Renner
*Assistant Examiner* — Jay Vogel
(74) *Attorney, Agent, or Firm* — Schwegman Lundberg & Woessner, P.A.

(57) ABSTRACT

A client station (STA), when operating in a wireless network, receives data sent by an access point (AP) on a first channel comprising at least one subchannel. During reception of the data on the first channel, the STA monitors channel availability of an additional set of one or more subchannels. In response to a detected availability of at least one newly-available subchannel, the STA sends at least one notification to the AP identifying STA-side availability of the newly-available subchannel(s). The STA subsequently receives data from the AP on the newly-available subchannel (s), which is sent in response to the at least one notification. The AP, when communicating data to the STA, receives the at least one notification from the STA and, in response thereto, initiates data transmission on one or more of the newly-available channel(s).

30 Claims, 8 Drawing Sheets

(56) References Cited

OTHER PUBLICATIONS

"IEEE 802.11ac: Dynamic Bandwidth Channel Access", Proc. IEEE ICC, 2011, (2011).
"IEEE802.11ac: The Next Evolution of Wi-FiTM Standards", Qualcomm, [Online]. Retrieved from the Internet: <URL: http://www.qualcomm.com/media/documents/ieee80211ac-next-evolution-wi-fi>, (Aug. 21, 2012), 15 pgs.
"Part 11: Wireless LAN Medium Access Control (MAC) and Physical Layer (PHY) Specifications", IEEE Std 802.11™-2016—IEEE Standard for Information technology—Telecommunications and information exchange between systems Local and metropolitan area networks—Specific requirements, (Dec. 7, 2016), 3534 pgs Submitted in 3 parts—due to file size.
"Part 11: Wireless LAN Medium Access Control (MAC) and Physical Layer (PHY) Specifications", IEEE Std 802.11™-2012—IEEE Standard for Local and Metropolitan Area Networks—Telecommunications and Information Exchange Between Systems—Local and Metropolitan Area Networks—Specific Requirements, (Mar. 29, 2012), 2793 pgs Submitted in 2 parts—due to file size.
Aryafar, Ehsan, et al., "MIDU: Enabling MIMO Full Duplex", Proceedings of ACM MobiCom, (2012), 12 pgs.
Bejarano, Oscar, et al., "IEEE 802.11ac: from channelization to multi-user MIMO", IEEE Communications Magazine; vol. 51, Issue: 10, (2013), 84-90.

\* cited by examiner

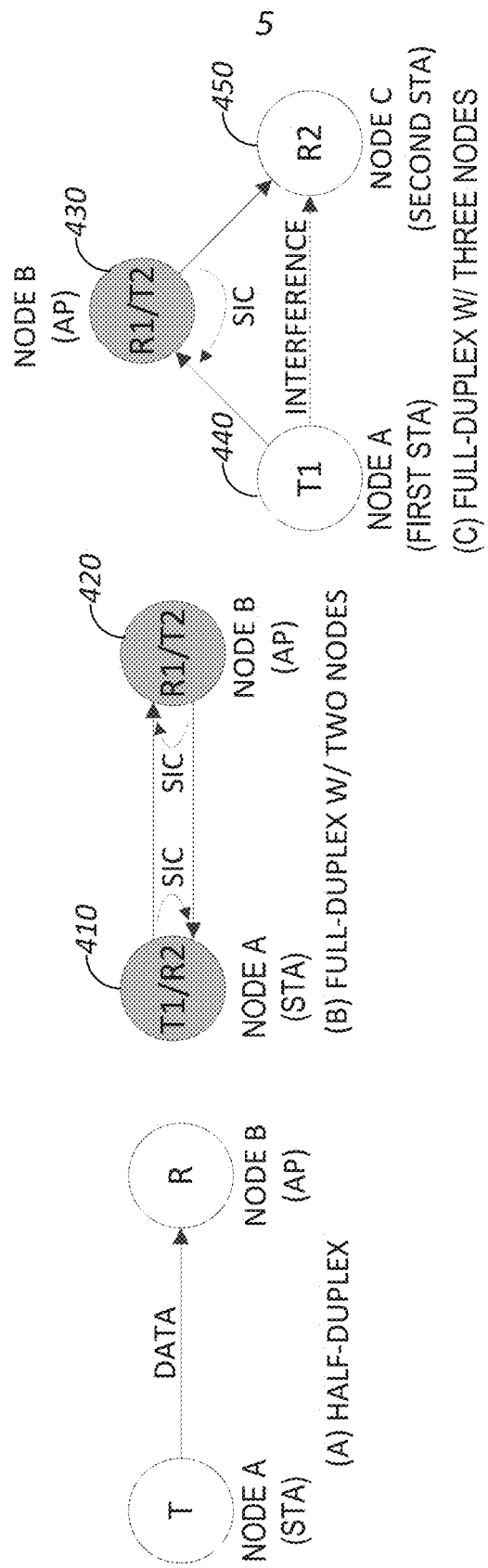

CLIENT-DRIVEN DYNAMIC CHANNEL ADAPTATION IN WIRELESS NETWORKING

TECHNICAL FIELD

Aspects of the disclosure relate generally to information processing and communications and, more particularly, to wireless networking. Some embodiments relate to client stations (STAs) and access point stations (APs) that operate according to the Institute of Electrical and Electronic Engineers (IEEE) 802.11 family of wireless networking standards, while other embodiments are more generally applicable outside the purview of the IEEE 802.11 family of standards. Some embodiments relate to the IEEE 802.11ac standard, the IEEE 802.11ax study group (SG) (named DensiFi) or IEEE 802.11ay. Some embodiments relate to high-efficiency (HE) wireless or high-efficiency WLAN or Wi-Fi (HEW) communications.

BACKGROUND

Wireless networking has been continually growing in its ubiquity over the years. For example, access point stations (APs) that operate according to the media access control and physical layer specifications standardized in the Institute of Electrical and Electronic Engineers (IEEE) 802.11 family of wireless networking standards are presently found in homes, businesses, public facilities, transportation vehicles, and even wider areas such as being deployed to provide coverage throughout some cities. Client stations (STAs) are commonly integrated into a variety of electronic devices, such as personal computers, smartphones, tablets, and other portable computing devices, televisions, media players, and other appliances, cameras and other data-gathering devices, medical equipment, and countless other applications.

Wireless communications are generally conducted over defined channels in the frequency spectrum. Recent advances in the technology have introduced a number of features to improve the data communications throughput that APs and STAs can support. One such feature is variable bandwidth selection, which works by allowing stations to combine multiple channels that are found to be available for communications by transmitter-receiver pair. While it is desirable to increase the data communications capacity with greater bandwidth allocation for a communication session, using greater bandwidth increases the communication session's susceptibility to interference. A major source of such interference are other wireless networking communications taking place in the same vicinity as the communication session of interest. Interference is a dynamic phenomenon in that it may be present at one moment and absent at the next. One challenge for system designers is to make use of the available clear-channel capacity as it varies with the varying presence of interference.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 4A-4C illustrate wireless communication scenarios with half duplex (HD) vs. FD radio operations, as may be used in accordance with some embodiments.

DETAILED DESCRIPTION

Figure 1:
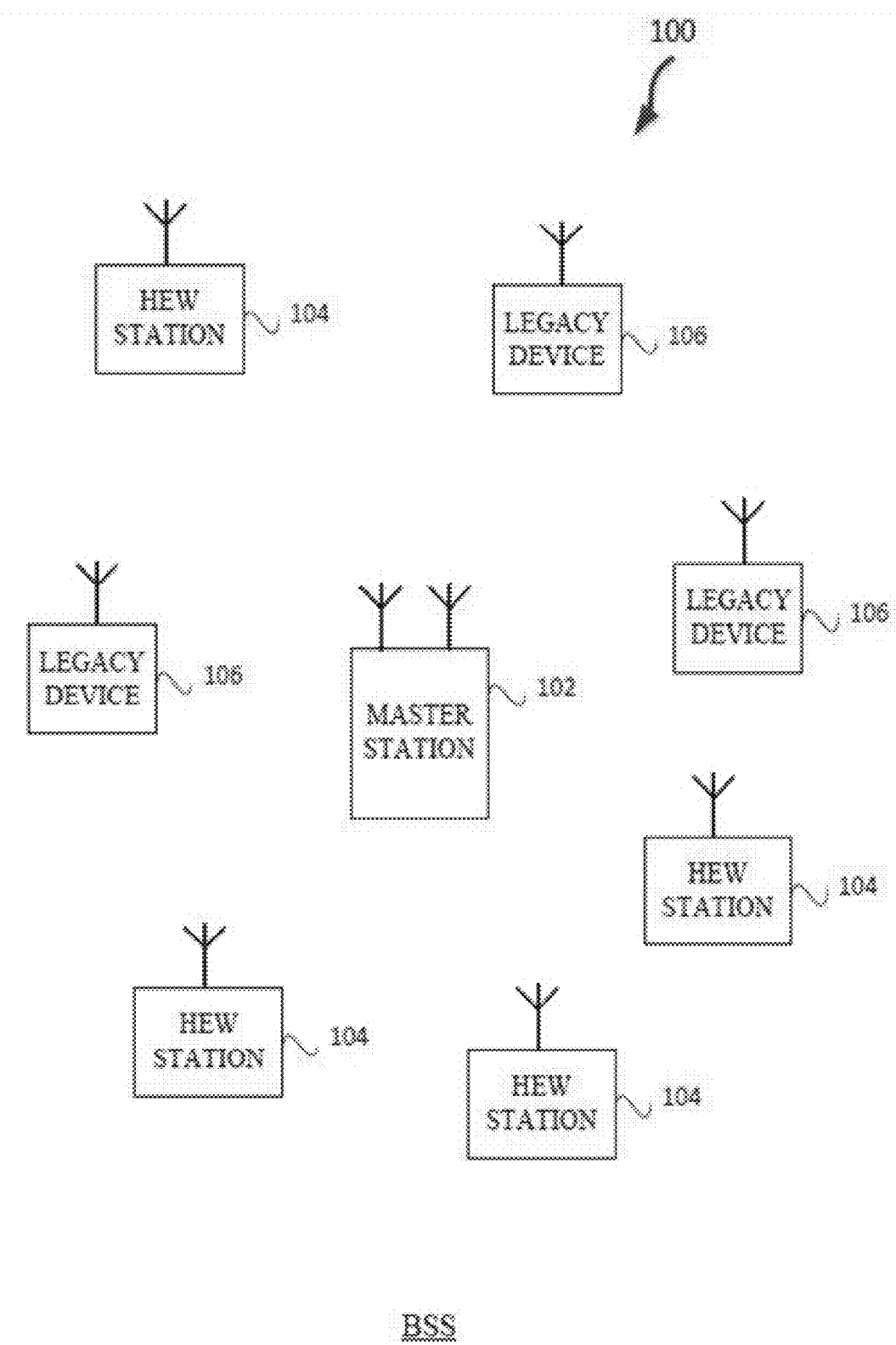
FIG. 1 is a high-level system diagram illustrating a WLAN in accordance with some embodiments.

Embodiments are directed generally to wireless communications between mobile or fixed stations in which there are variable, selectable channel configurations over which the communications may take place. In the present context, a channel configuration includes a selected set of one or more channels, or subchannels, over which the wireless communications are conducted. The IEEE 802.11 family of wireless local area networking (WLAN) standards provide for variable and selectable channel configurations, and for the sake of brevity the present disclosure describes various embodiments in the context of certain IEEE 802.11 WLAN implementations. However, it will be understood that the principles described herein may be suitably adapted to be applied in other types of wireless communications regimes, whether presently known, or arising in the future. These other types of wireless communications regimes may be other types of WLANs, peer-to-peer arrangements, wireless ad-hoc networks, wide-area networks (WANs), or entirely different systems.

One notable feature of recent IEEE 802.11 standard revisions is the support for wider channels as well as dynamic channel access. For example, assume 4 sub-channels each with 20 MHz of bandwidth. An 802.11ac access point (AP) that assesses all subchannels as free can potentially concurrently transmit on all 4 sub-channels, significantly increasing its bandwidth and hence throughput. If some of the sub-channels are busy, the AP can still potentially transmit on the remaining free sub-channels.

Some aspects of the invention recognize that in Wi-Fi based deployments, transmitter and receiver oftentimes have different topological views. As a result, a sub-channel that is available at the transmitter may not be available at the receiver. This difference in topological views or channel availability status increases as the distance between the transmitter and receiver increases. For example, assume 4 sub-channels that are all free on the AP side, but only two of them are free on the client (STA) side. As a result, only the two common free sub-channels would be used for communication between the AP and the STA. Due to the dynamic nature of the channel, it is possible that midway through frame reception by the STA, additional channels become available on the client side.

In conventional 802.11 standard implementations, it has not been possible to take advantage of the opportunity to change channel bandwidth midway through transmission in order to maximize the utilization of available bandwidth resources. Some embodiments of the invention advantageously provide a STA-driven operability in which channel selection is made to automatically perform bandwidth adaptation midway through the wireless data communication. Accordingly, the STA may intelligently inform the AP regarding variations in channel availability, which can be opportunistically used by the AP to increase the communication bandwidth and hence data communications throughput.

As described in greater detail below, according to some embodiments, a STA, while receiving data on its primary subchannel and optionally on one or more non-primary subchannels, continuously monitors the other secondary subchannels, and notifies the AP when additional subchannels become available on the STA side. The additional subchannels may or may not be contiguous with the primary subchannel according to various embodiments.

In related embodiments, when monitoring adjacent or nearby channels to the channel or channels currently in use, the STA deploys adjacent channel interference cancellation techniques. Various adjacent channel interference cancellation techniques are known, and these embodiments contemplate any suitable technique from among those already known, as well as those arising in the future.

In a related embodiments, the new subchannel availability notification is sent explicitly to the AP using full-duplex communications functionality (e.g., in-band self-interference cancellation and in-band simultaneous transmission and reception). This notification may be sent on the primary subchannel. In other related embodiments, the notification is implicitly sent by the STA through clear-to-send (CTS) frames on additional secondary subchannels determined by the STA to be newly available.

In response, according to a related embodiment, the AP may perform its own determination of AP-side availability of the additional secondary subchannels, and select the mutually-available subchannels on which to add data transmission. In another embodiment, the AP omits this operation.

In other embodiments, the AP assesses the local availability (i.e., on the AP side) of the additional secondary subchannels reported by the STA, but does not simply exclude certain subchannels that are not available on the AP side if those subchannels are available on the STA side. Instead, the AP uses those STA-available subchannels to transmit data to the STA, but not to receive data or control frames from the STA. Accordingly, the AP may configure the STA using control messaging to send acknowledgement (ACK) and other messages pertaining to those subchannels on one or more other subchannels that are mutually available to the STA and the AP.

FIG. 1 is a high-level system diagram illustrating a WLAN in accordance with some embodiments. The WLAN may comprise a basis service set (BSS) 100 that may include a master station 102, which may be an access point station (AP), a plurality of high-efficiency wireless (HEW) (e.g., IEEE 802.11ax) client stations (STAs) 104 and a plurality of legacy (e.g., IEEE 802.11n/ac) STA devices 106.

The master station 102 may be an AP operating in accordance with one or more standards of the IEEE 802.11 family of standards to transmit and receive data communications. The master station 102 may be a base station. The master station 102 may use other communications protocols as well as the IEEE 802.11 protocols. The IEEE 802.11 protocol may be IEEE 802.11ax. The IEEE 802.11 protocol may include a multiple access technique such as, for example, orthogonal frequency division multiple-access (OFDMA), time division multiple access (TDMA), and/or code division multiple access (CDMA). The IEEE 802.11 protocol may also include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and subchannel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations may refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

Figure 2:
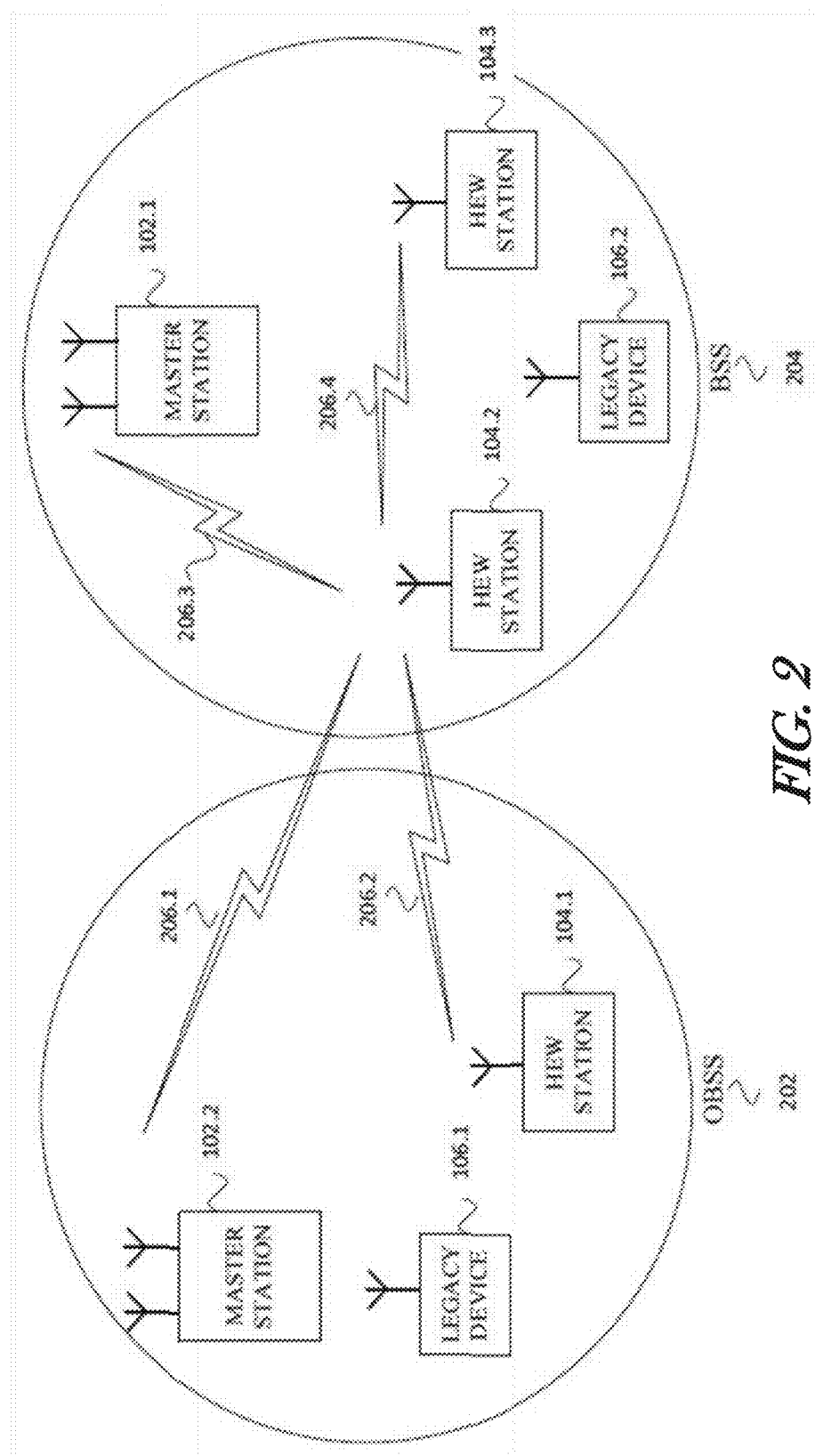
FIG. 2 illustrates a basic service set (BSS) and an overlapping basic service set (OBSS) in accordance with some embodiments

FIG. 2 illustrates a basic service set (BSS) and an overlapping basic service set (OBSS) in accordance with some embodiments. Illustrated in FIG. 2 are an OBSS 202 and BSS 204. The OBSS 202 includes one or more master stations 102, one or more HEW stations 104, and one or more legacy devices 108. The HEW station 104.1 and legacy device 106.1 are associated with the master station 102.2. The master station 102.2 has an identification (not illustrated) for the OBSS 202, which may be termed a BSS identification (BSSID). In some embodiments, the identification is termed the color of the OBSS 202. The HEW station 104.1 stores a MAC address (see FIGS. 3, 4, and 5) of the master station 102.2. The OBSS 202 is a BSS 100. The OBSS 202 is termed an OBSS 202 to BSS 204 because some of the signals 206 overlap with the BSS 204.

The BSS 204 includes one or more master stations 102, one or more HEW stations 104.2, 104.3, and one or more legacy devices 106.2. The HEW stations 104.2 and 104.3 and legacy device 106.1 are associated with the master station 102.1. The master station 102.1 has an identification (not illustrated) for the BSS 204, which may be termed a BSSID. In some embodiments, the identification is termed the color of the BSS 204. The HEW stations 104.2 and 104.3 store a MAC address (see FIGS. 3, 4, and 5) of the master station 102.1.

Signal 206.1 is transmitted from the master station 102.2 and received by HEW station 104.2. Signal 206.2 is transmitted from HEW station 104.1 and received by HEW station 104.2. Signal 206.4 is transmitted from the HEW station 104.3 and received by HEW station 104.2. Signal 206.3 is transmitted by master station 102.1 and received by HEW station 104.2. The signals 206 may be frames transmitted by a master station 102, HEW station 104, legacy device 106, and/or another wireless device (not illustrated).

Figure 3:
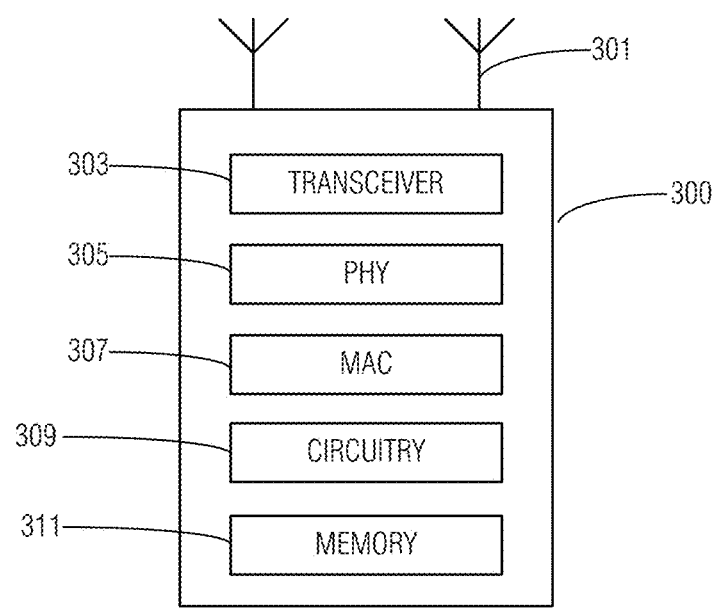
FIG. 3 is a block diagram illustrating a HEW device in accordance with some embodiments.

FIG. 3 is a block diagram illustrating a HEW device in accordance with some embodiments. HEW device 300 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 300 may be suitable for operating as master station 102 (FIG. 1) or a HEW STA 104 (FIG. 1). In accordance with embodiments, HEW device 300 may include, among other things, a transmit/receive element 301 (for example an antenna), a transceiver 303, physical (PHY) circuitry 305, and media access control (MAC) circuitry 307. PHY circuitry 305 and MAC circuitry 307 may be HEW compliant layers and may also be compliant with one or more legacy IEEE 802.11 standards. MAC circuitry 307 may be arranged to configure frames such as a physical layer convergence procedure (PLCP) protocol data unit (PPDUs) and arranged to transmit and receive PPDUs, among other things. HEW device 300 may also include circuitry 309 and circuitry 309 configured to perform the various operations described herein. The circuitry 309 may be coupled to the transceiver 303, which may be coupled to the transmit/receive element 301. While FIG. 3 depicts the circuitry 309 and the transceiver 303 as separate components, the circuitry 309 and the transceiver 303 may be integrated together in an electronic package or chip.

In some embodiments, the MAC circuitry 307 may be arranged to contend for a wireless medium during a contention period to receive control of the medium for the HEW control period and configure an HEW Physical Layer Convergence Protocol Data Unit (PPDU). In some embodiments, the MAC circuitry 307 may be arranged to contend for the wireless medium based on channel contention settings, a transmitting power level, and a CCA level.

One of the more notable recent enhancements to the 802.11 standard is the support for wider channels, as well as both, dynamic, and static channel access More recent releases (e.g., 802.11ac and later) call for all devices to support 20, 40, and 80 MHz channels. In addition. support is provided for operation on 160-MHz channels. Similar to legacy versions such as 802.11n, channels that are 40 MHz or wider always require a primary 20-MHz-wide sub-channel Additionally, 80-MHz channels have a primary 40-MHz (which includes the primary 20-MHz) subchannel and a secondary 40-MHz subchannel. The same applies to 160-MHz channels.

In order for a STA to be able to transmit an 80 MHz packet, two conditions must be true: 1) The primary channel needs to be idle for DIFS plus the back-off counter duration; and 2) All secondary sub-channels must have been idle for a duration of PIFS immediately preceding the expiration of the back-off counter.

Conventionally, should any of the secondary sub-channels be busy, the STA can follow either static or dynamic channel access rules. In static channel access, if the secondary subchannel is busy, the STA will choose a random backoff period within the current contention window size to restart the contention process and continue to attempt until no interference is present in any of the subchannels. In dynamic channel access, the STA may attempt to transmit over a narrower channel using 20 or 40 MHz instead. This represents a more flexible approach, which allows for more efficient resource allocation because the STA retains the capability to transmit, albeit over a fraction of the original bandwidth. According to recent standard revisions of 802.11, all transmission always have to include the primary subchannel in order to inform the receiver of which channels the transmitter will use.

The PHY circuitry 305 may be arranged to transmit the HEW PPDU. The PHY circuitry 305 may include circuitry for modulation/demodulation, upconversion/downconversion, filtering, amplification, etc. In some embodiments, the circuitry 309 may include one or more processors. The circuitry 309 may be configured to perform functions based on instructions being stored in a RAM or ROM, or based on special purpose circuitry. The circuitry 309 may include processing circuitry and/or transceiver circuitry in accordance with some embodiments. The circuitry 309 may include a processor such as a general purpose processor or special purpose processor. The circuitry 309 may implement one or more functions associated with transmit/receive elements 301, the transceiver 303, the PHY circuitry 305, the MAC circuitry 307, and/or the memory 311.

In some embodiments, the transmit/receive elements 301 may be two or more antennas that may be coupled to the PHY circuitry 305 and arranged for sending and receiving signals including transmission of the HEW frames. The transceiver 303 may transmit and receive data such as HEW PPDU and frames that include an indication that the HEW device 300 should adapt the channel contention settings according to settings included in the frame. The memory 311 may store information for configuring the other circuitry to perform operations for configuring and transmitting HEW frames and performing the various operations to perform one or more of the functions and/or methods described herein.

In some embodiments, the HEW device 300 may be configured to communicate using OFDM communication signals over a multicarrier communication channel. In some embodiments, HEW device 300 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 300 may use 4× symbol duration of 802.11n or 802.11ac.

In some embodiments, an HEW device 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Examples, as described herein, may include, or may operate on, one or more engines. Engines are tangible entities (e.g., hardware) capable of performing specified operations and may be configured or arranged in a certain manner. In an example, circuits may be arranged (e.g., internally or with respect to external entities such as other circuits) in a specified manner as an engine. In an example, the whole or part of one or more computer systems (e.g., a standalone, client or server computer system) or one or more hardware processors may be configured by firmware or software (e.g., instructions, an application portion, or an application) as an engine that operates to perform specified operations. In an example, the software may reside on a machine readable medium. In an example, the software, when executed by the underlying hardware of the engine, causes the hardware to perform the specified operations.

Accordingly, the term "engine" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which engines are temporarily configured, each of the engines may be instantiated at a particular moment in time. For example, where the engines comprise a general-purpose hardware processor configured using software, the general-purpose hardware processor may be configured as respective different engines at different times. Software may accordingly configure a hardware processor, for example, to constitute a particular engine at one instance of time and to constitute a different engine at a different instance of time.

Some embodiments may be implemented using software and/or firmware in combination with execution hardware, such as the processing elements described above. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Full duplex (FD) radio (or communication) is a technology that can significantly improve spectrum efficiency by allowing wireless radios/devices to simultaneously transmit and receive radio frequency (RF) signals on the same frequency channel. FD became feasible only recently thanks to the advances in analog/digital self-interference cancellation (SIC) technologies.

FIGS. 4A-4C illustrate wireless communication scenarios with half duplex (HD) vs. FD radio operations, as may be used in accordance with some embodiments. FIG. 4A illustrates HD operations. In HD operation, each radio operates as either a transmitter (denoted as "T" in the drawing) or a receiver (denoted as "R" in the drawing) at any given time. On the other hand, FD radios can transmit and receive on the same channel simultaneously.

FIGS. 4B-4C illustrate FD radios, which can transmit and receive on the same channel simultaneously. In FIG. 4B, the nodes 410, 420, 430 are operating in FD mode. FIG. 4B illustrates full duplex operation with two nodes. Node A and Node B exchange data in FD mode. In this scenario, the receivers R1 (Node B), 420, and R2 (node) 410, can successfully decode their received signals by canceling self-interference caused by their co-located transmitters T2 420 and T1 410 using self-interference cancellation (SIC) technologies implemented in their analog RF circuitry and digital signal processing.

FIG. 4C illustrates full duplex operation with three nodes. Here node A, 440, Node B, 430, and Node C, 450, are involved in FD communications. For example, Node B can be an access point (AP) in 802.11 WLAN, and Node A and Node C can be client devices. In this scenario, Node B (AP) has data to send to Node C (downlink), and Node A has data to Node B (uplink), hence two FD communication links can be established simultaneously, i.e., T1 (A) R1 (B) and T2(B) R2(C) by leveraging Node B (AP)'s SIC capability. While R1 (Node B) can cancel self-interference caused by T2, R2 (Node C) may suffer from inter-node interference from T1 (A) R2(C).

In some examples, a wireless medium reservation message, such as a Request to Send (RTS) message and a confirmation message of the wireless reservation message, such as a Clear to Send (CTS) message may allow the communicating wireless devices to communication in full duplex communication. The RTS and CTS messages are specified by the 802.11 standards for reserving the wireless medium. The RTS message is sent by a first one of the two communicating wireless devices (sometimes referred to as the "initiating device") and is acknowledged by a CTS message by the second one of the two communicating devices (sometimes referred to as the "responding device"). The RTS frame carries a duration value which covers the CTS response plus the time needed for the subsequent data exchange. The CTS response includes a duration field which may be set to the duration field value seen in the RTS less both the Short Interframe Space (SIFS) period and the duration of the CTS response itself. Other devices in the wireless network which hear one or both of these messages will refrain from transmitting based upon the duration values specified in these messages. Once the data exchange period begins, both the initiating device and the responding device may thus transmit and receive simultaneously. Devices may signal their capabilities to engage in full-duplex transmissions through prior signaling. For example, devices may signal their capabilities in one or more fields in a message preamble such as a HT Capabilities field of a Beacon, Probe Response, or other suitable message.

FIGS. 5A-5D are diagrams illustrating wireless communications exchange between a STA and an AP according to various embodiments. In these examples, a STA may be realized as HEW device 104, and an AP may be realized as master station 102, for instance. In these embodiments, the STA and the AP can each selectively transmit simultaneously on one or more specific subchannels, and can receive data or control frames simultaneously transmitted on a plurality of the subchannels.

In FIGS. 5A-5D, information communicated wirelessly between the STA and the AP is depicted as a function of time t oriented along the horizontal axis. An exemplary set of subchannels are indicated as CH1-CH4, and are plotted along the vertical axis, which represents a portion of the frequency band being utilized. Subchannels CH1-CH4 may each have a bandwidth of 20 MHz, for example, and contiguous subchannels may be grouped into a common channel (e.g., 40, 60, or 80 MHz wide). Other embodiments are contemplated in which non-contiguous channels are used, optionally in combination with separated groupings of contiguous subchannels. In the example depicted, subchannel CH3 is a primary subchannel of the AP, with the other subchannels being non-primary subchannels.

Interference as seen on the side of the STA is indicated at 502, and represented as a diagonally-shaded block. As depicted, STA-side interference 502 is present on subchannels CH1 and CH2, ceasing at time 510. Interference 502 may be caused by another AP or neighboring STA located in the vicinity, or within communications range, of the STA of interest, but not communicating with the STA of interest. Data and control frames transmitted by the AP are shown as non-shaded blocks, whereas data and control frames transmitted by the STA are shown as cross-hash-shaded blocks.

At 504, a communication session is initiated by the AP by the transmission of request-to-send (RTS) frames on each of subchannels CH1-CH4. Under the depicted circumstance with interference 502 being present on subchannels CH1 and CH2 at the STA side, the STA only receives the RTS frames on subchannels CH3 and CH4. Accordingly, at 506, the STA responds with clear-to-send (CTS) frames on subchannels CH3 and CH4. Upon receipt of the CTS frames, the AP begins transmission of data 508, which is received by the STA. During reception of data 508, the STA monitors subchannels CH1 and CH2 for cessation of the interference.

At 510, interference 502 ceases, resulting in subchannels CH1 and CH2 becoming clear. By virtue of the monitoring activity, the STA detects the newly-available subchannels CH1 and CH2.

In response to the detection, the STA notifies the AP that these subchannels have become available. In the present example depicted in FIG. 5A, the notification takes the form of a control frame 512. In the embodiment shown, control frame 512 is sent over primary subchannel CH3, though in other embodiments, a different subchannel (e.g., CH4) may be used for the control frame 512. Notably, control frame 512 is sent and received using full-duplex functionality of the STA and the AP, respectively. The control frame 512 may contain information such as the ID of the STA, the ID of the AP, indices of the newly-available subchannels on the STA side, the signal-to-noise ratio of each subchannel, and other relevant information.

Upon reception of the control frame, the AP determines the mutually-available subchannels on both sides and responds by sending RTS frames on those subchannels. In the present example, the RTS frames sent at 514 are on subchannels CH1 and CH2. Upon receipt of the RTS frames on the newly-available subchannels, the STA responds with CTS frames on the corresponding subchannels at 516 to complete the handshaking operation. Thereafter, the AP initiates transmission of data 518.

If, as in the basic example depicted, the newly-utilized subchannels are contiguous with the in-use subchannels, all of the contiguous subchannels may be treated as a single channel with a bandwidth corresponding to the sum of the individual contiguous subchannel bandwidths. Otherwise, in the case of non-contiguous subchannels, the AP may break apart the data stream to transmit different portions separately on respective channels or sub-channels, as applicable.

At the conclusion of the transmission of data 508 and 518 (and in response to a successful parity check or cyclical redundancy check (CRC), the STA transmits an ACK frame on each applicable subchannel to conclude the communication session.

Figure 5A:
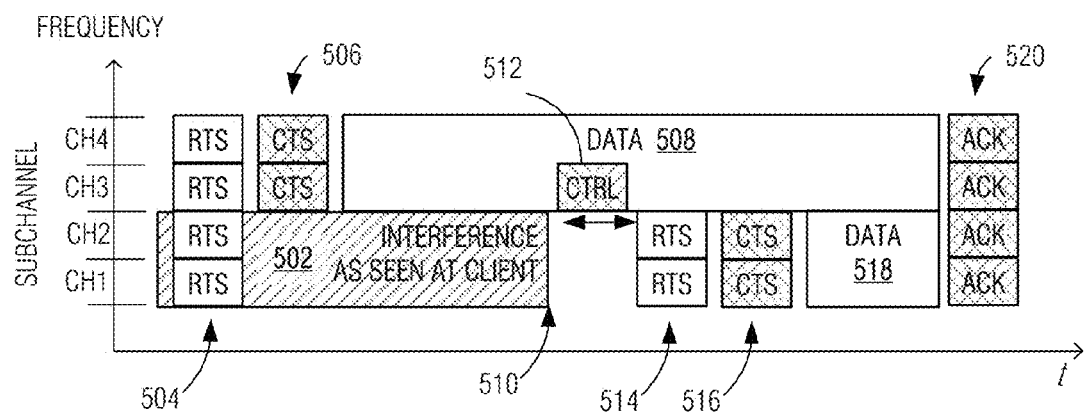
FIGS. 5A-5D are diagrams illustrating wireless communications exchange between a STA and an AP according to various embodiments.
Figure 5B:
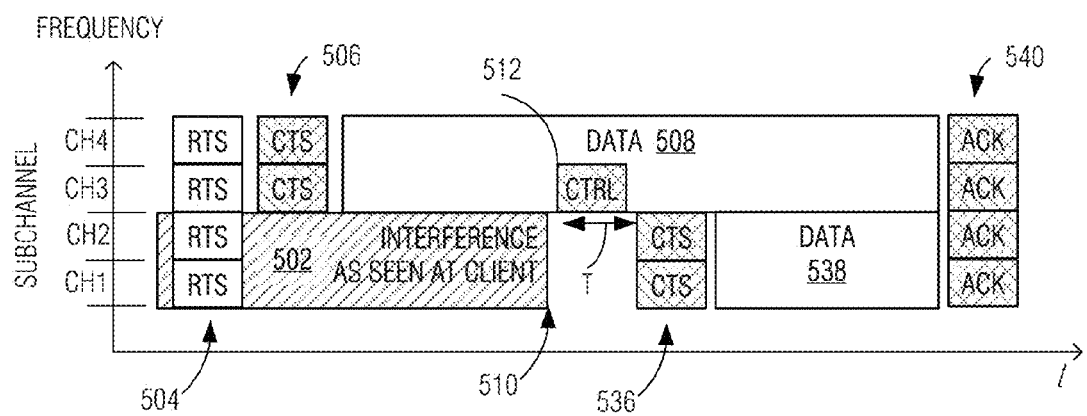
Figure 5C:
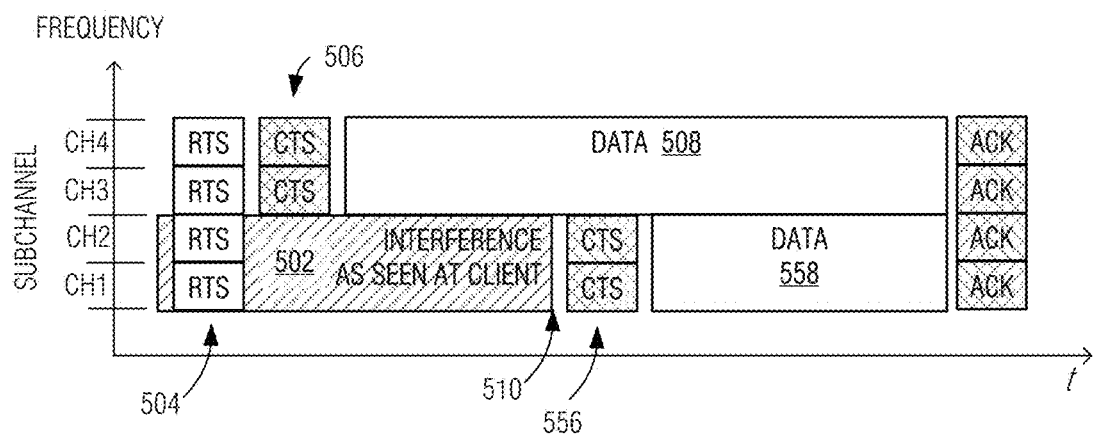
Figure 5D:
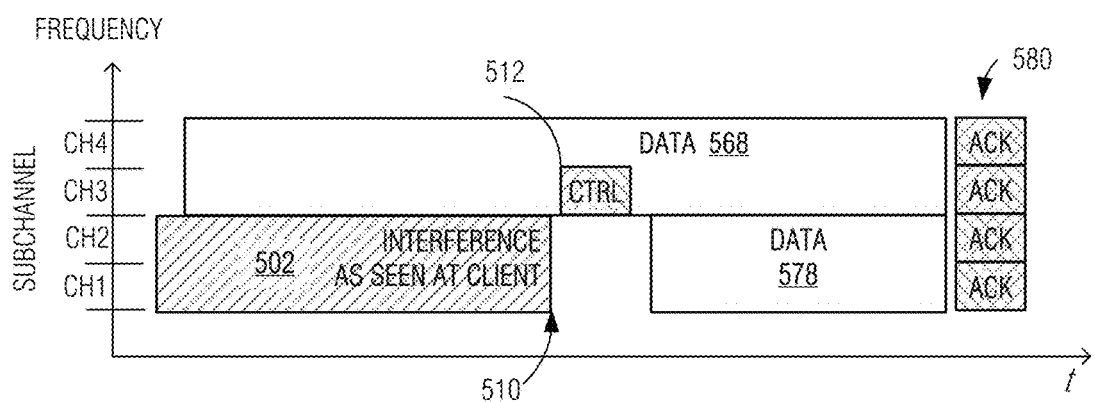

FIGS. 5B-5D each presents a similar interference situation, with interference 502 present on subchannels CH1 and CH2 at the STA side until ceasing at 510. However, each of the operational sequences depicted in FIGS. 5B-5D exemplifies a variant embodiment. Turning first to FIG. 5B, the communication of data 508 is initiated in the same manner as discussed above with reference to FIG. 5A, namely, with the RTS/CTS handshaking exchange indicated at 204 and 506. Likewise, in response to the cessation of interference 502 at time 510, the STA sends control frame 512. This embodiment differs in that the STA automatically follows the transmission of control frame 512 with the transmission of CTS frames at 536. Here, the RTS frames indicated at 514 in FIG. 5A are omitted, which allows for more rapid access to subchannels CH1 and CH2 for data 538. In a related embodiment, the CTS frames sent at 536 are specifically delayed by the STA for a time duration T so that the AP is afforded sufficient time to conduct a local (AP-side) assessment of the mutually-available subchannels. The transmission of data 508 and 538 is concluded with ACK frames at 540.

In the embodiments of FIG. 5C, the notification of newly-available subchannels is provided implicitly by the STA, rather than explicitly by control frame 512. Here, in response to the cessation of interference 510, the STA transmits CTS frames at 556 on the newly-available subchannels. This operation allows an even earlier start to the transmission of data 558.

FIG. 5D depicts another type of embodiment of the STA and AP. Here, the STA and the AP are configured to omit the RTS/CTS handshaking entirely. Accordingly, the STA monitors all of the available subchannels, particularly, the primary subchannel CH3 for data transmission, which is initiated by the AP without prior notice. the STA provides an explicit notification of the cessation of the interference 502 at 510 by control frame 512, and monitors the subchannels for additional data 578. Data transmission is concluded with ACK frames at 580. These embodiments provide greater time resources for data throughput by omitting the handshaking exchanges.

Figure 6:
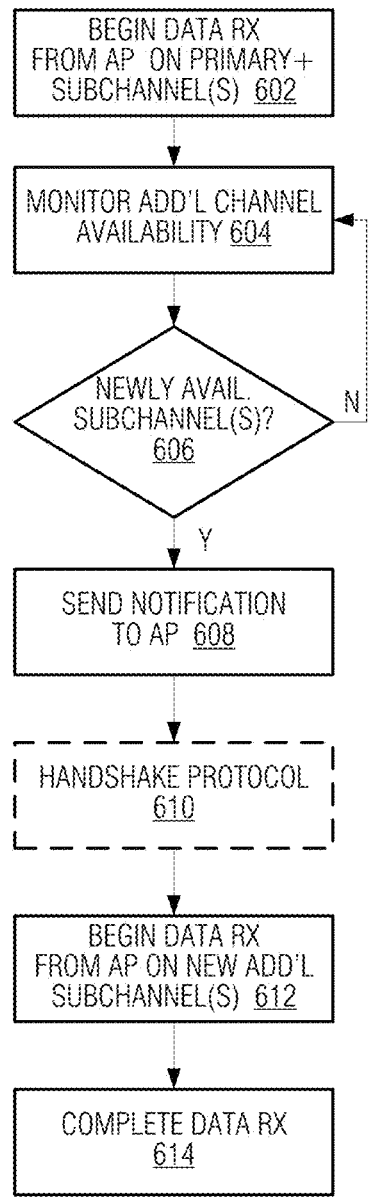
FIG. 6 is a flow diagram illustrating an example process of operation of a STA to perform dynamic channel adaptation according to some embodiments.

FIG. 6 is a flow diagram illustrating an example process of operation of a STA to perform dynamic channel adaptation according to some embodiments. At 602, the STA begins receiving data from the AP. The data is received at least on the primary subchannel, and may be received on additional subchannels, whether contiguous, or non-contiguous. As the reception proceeds, the STA monitors other subchannels for availability. The monitoring may include making such measurements as received signal strength indication (RSSI) on each of the currently unused subchannels, for instance. At decision 606, the STA determines whether or not any subchannel has become newly available. In the affirmative case, the process advances to operation 608, where the STA sends a notification to the AP about the newly-available subchannel(s). As described above, the notification may take a variety of forms, such as a full-duplex control frame transmitted on the primary (or another) subchannel, CTS frame(s) on each of the newly-available subchannels, a combination of control frame and CTS frame(s), or some other suitable form.

At 610, according to some embodiments, a handshaking protocol is carried out with the AP, such as a RTS/CTS exchange, for example. At 612, the STA begins receiving data on the newly-available one or more subchannels. As discussed above, the subchannels on which the additional data is received may be subchannels that are mutually available to the STA as well as the AP, or they may be simply available at the STA side (in which case they may not be available to carry return signaling from the STA to the AP). Data reception is concluded at 614 with the transmission of a ACK frame on each subchannel on which data was received, or on the primary subchannel, for example.

Figure 7:
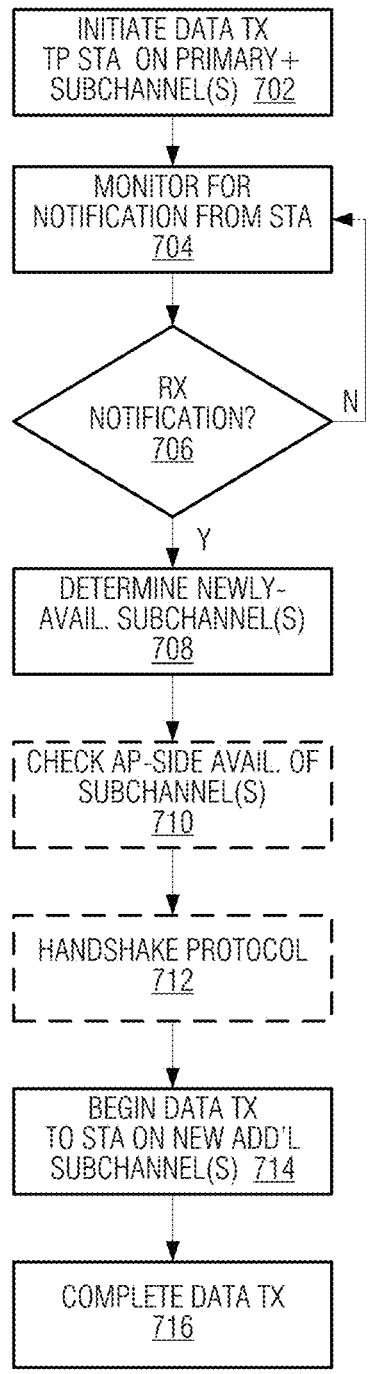
FIG. 7 is a flow diagram illustrating an example process of operation for an AP to perform dynamic channel adaptation according to some embodiments.

FIG. 7 is a flow diagram illustrating an example process of operation for an AP to perform dynamic channel adaptation according to some embodiments. At 702, the AP initiates data transmission to the STA. As discussed above, this initiation of transmission may be preceded in some embodiments by a handshaking exchange using RTS frames and CTS frames to determine the mutually-available subchannels and confirm the STA's readiness to receive the data. In other embodiments, the handshaking may be omitted. In a related embodiment, the data transmission always includes transmission on the primary subchannel. During the data transmission, the AP monitors for any notifications from the STA regarding the opening up of additional subchannels on the STA side, as indicated at 704. In response to such notification at decision 706, the process advances to operation 708, in which the AP reads the notification to determine the particular one or more subchannels that are indicated as being newly available via the notification. As described above, the notification may take a number of different forms.

In some embodiments, at 710, the AP checks its local environment for availability of the indicated STA-side newly-available channels. Next, in some embodiments, a handshaking protocol (which may be bilateral or unilateral) may be conducted at 712 to initiate transmission of additional data on at least one of the newly-available subchannels. At 714, the additional data transmission is initiated. Finally, at 716, after the transmission of the data in the communication session, the transmission may be concluded with receipt of ACK frames on each of the subchannels used for data transmission, on the primary subchannel, or elsewhere.

ADDITIONAL NOTES & EXAMPLES

Example 1 is an apparatus for a client station (STA), the apparatus comprising transceiver circuitry and hardware processing circuitry, the hardware processing circuitry to configure the transceiver circuitry to: receive data sent by an access point (AP) on a first channel comprising at least one subchannel; and during reception of the data on the first channel: monitor channel availability of an additional set of one or more subchannels distinct from the first channel; in response to a detected availability of at least one newly-available subchannel of the additional set, send at least one notification to the AP identifying STA-side availability of the at least one newly-available subchannel; receive data from the AP on the at least one newly-available subchannel, wherein the data from the AP on the at least one newly-available subchannel is sent in response to the at least one notification.

In Example 2, the subject matter of Example 1 optionally includes, wherein transmission of the data on the first channel is initiated by the AP.

In Example 3, the subject matter of any one or more of Examples 1-2 optionally include, wherein the at least one notification includes a control frame sent via full-duplex mode on at least one subchannel of the first channel.

In Example 4, the subject matter of any one or more of Examples 1-3 optionally include, wherein the first channel includes a primary subchannel and a non-primary subchannel, and wherein the at least one notification is sent on the primary subchannel.

In Example 5, the subject matter of any one or more of Examples 1-4 optionally include, wherein the at least one notification includes a clear-to-send (CTS) frame on each of the at least one newly-available subchannel.

In Example 6, the subject matter of any one or more of Examples 1-5 optionally include, wherein the at least one notification includes a control frame sent via full-duplex mode on at least one subchannel of the first channel, and, subsequently, a clear-to-send (CTS) frame on each of the at least one newly-available subchannel.

In Example 7, the subject matter of Example 6 optionally includes, wherein the clear-to-send (CTS) frame on each of the at least one newly-available subchannel is sent according to a predefined time delay following the control frame.

In Example 8, the subject matter of Example 7 optionally includes, wherein the predefined time delay is to permit the AP to assess AP-side channel availability of the at least one newly-available subchannel prior to initiation of data transmission on the at least one newly-available subchannel.

In Example 9, the subject matter of any one or more of Examples 1-8 optionally include, wherein the hardware processing circuitry further configures the transceiver circuitry to: in response to sending of the at least one notification, and during reception of the data on the first channel, receive a request-to-send (RTS) frame on at least one mutually-available channel of the at least one newly-available subchannel that is available to both, the client station, and the AP; and in response to receiving the RTS frame on the at least one mutually-available channel, send a clear-to-send (CTS) frame on the at least one mutually available channel.

In Example 10, the subject matter of any one or more of Examples 1-9 optionally include, wherein the additional set of one or more subchannels are contiguous with the first channel.

In Example 11, the subject matter of any one or more of Examples 1-10 optionally include, wherein the additional set of one or more subchannels are noncontiguous with the first channel.

In Example 12, the subject matter of any one or more of Examples 1-11 optionally include, wherein the first channel has a bandwidth equal to a positive integer multiple of a bandwidth of a subchannel.

In Example 13, the subject matter of any one or more of Examples 1-12 optionally include, wherein each subchannel has a bandwidth of 20 MHz, and wherein the first channel has a variable bandwidth selected from the group consisting of: 20 MHz, 40 MHz, 60 MHz, 80 MHz, 160 MHz.

Example 14 is an apparatus for an access point station (AP), the apparatus comprising transceiver circuitry and hardware processing circuitry, the hardware processing circuitry to configure the transceiver circuitry to: initiate data transmission to a client station (STA) on a first channel comprising at least one subchannel; and during transmission of the data on the first channel: receive at least one notification from the STA indicating channel availability of at least one STA-side newly-available channel from among an additional set of one or more subchannels that are distinct from the first channel; in response to receipt of the at least one notification, initiate data transmission on one or more of the at least one STA-side newly-available channel.

In Example 15, the subject matter of Example 14 optionally includes, wherein the hardware processing circuitry is to further configure the transceiver circuitry to: in response to the receipt of the at least one notification and prior to initiation of the data transmission on the one or more of the at least one STA-side newly-available channel, assess AP-side availability of at least one mutually-available channel from among the at least one STA-side newly-available channel, wherein the one or more of the at least one STA-side newly-available channel on which the data transmission is initiated is the at least one mutually-available channel.

In Example 16, the subject matter of any one or more of Examples 14-15 optionally include, wherein the at least one notification includes a control frame received via full-duplex mode on at least one subchannel of the first channel.

In Example 17, the subject matter of any one or more of Examples 14-16 optionally include, wherein the first channel includes a primary subchannel and a non-primary subchannel, and wherein the at least one notification is received on the primary subchannel.

In Example 18, the subject matter of any one or more of Examples 14-17 optionally include, wherein the at least one notification includes a clear-to-send (CTS) frame received on each of the at least one STA-side newly-available subchannel.

In Example 19, the subject matter of any one or more of Examples 14-18 optionally include, wherein the at least one notification includes a control frame received via full-duplex mode on at least one subchannel of the first channel, and, subsequently, a clear-to-send (CTS) frame on each of the at least one STA-side newly-available subchannel.

In Example 20, the subject matter of Example 19 optionally includes, wherein the clear-to-send (CTS) frame on each of the at least one STA-side newly-available subchannel is received according to a predefined time delay following the control frame.

In Example 21, the subject matter of any one or more of Examples 14-20 optionally include, wherein the additional set of one or more subchannels is contiguous with the first channel.

In Example 22, the subject matter of any one or more of Examples 14-21 optionally include, wherein the additional set of one or more subchannels is noncontiguous with the first channel.

In Example 23, the subject matter of any one or more of Examples 14-22 optionally include, wherein the first channel has a bandwidth equal to a positive integer multiple of a bandwidth of a subchannel.

In Example 24, the subject matter of any one or more of Examples 14-23 optionally include, wherein each subchannel has a bandwidth of 20 MHz, and wherein the first channel has a variable bandwidth selected from the group consisting of: 20 MHz, 40 MHz, 60 MHz, 80 MHz, 160 MHz.

Example 25 is a computer-readable storage medium that stores instructions for execution by one or more processors to perform operations for communication by a client station (STA) for a local area wireless network, the operations to configure the one or more processors to: receive data sent by an access point (AP) on a first channel comprising at least one subchannel; and during reception of the data on the first channel: monitor channel availability of an additional set of one or more subchannels distinct from the first channel; in response to a detected availability of at least one newly-available subchannel of the additional set, send at least one notification to the AP identifying STA-side availability of the at least one newly-available subchannel; receive data from the AP on the at least one newly-available subchannel, wherein the data from the AP on the at least one newly-available subchannel is sent in response to the at least one notification.

In Example 26, the subject matter of Example 25 optionally includes, wherein the instructions are to configure the one or more processors to send the at least one notification that includes a control frame sent via full-duplex mode on at least one subchannel of the first channel.

In Example 27, the subject matter of any one or more of Examples 25-26 optionally include, wherein the first channel includes a primary subchannel and a non-primary subchannel, and wherein the instructions are to configure the one or more processors to send the at least one notification on the primary subchannel.

In Example 28, the subject matter of any one or more of Examples 25-27 optionally include, wherein the instructions are to configure the one or more processors to send the at least one notification to include a clear-to-send (CTS) frame on each of the at least one newly-available subchannel.

In Example 29, the subject matter of any one or more of Examples 25-28 optionally include, wherein the instructions are to configure the one or more processors to send the at least one notification to include a control frame sent via full-duplex mode on at least one subchannel of the first channel, and, subsequently, a clear-to-send (CTS) frame on each of the at least one newly-available subchannel.

In Example 30, the subject matter of Example 29 optionally includes, wherein the clear-to-send (CTS) frame on each of the at least one newly-available subchannel is sent according to a predefined time delay following the control frame.

In Example 31, the subject matter of Example 30 optionally includes, wherein the predefined time delay is to permit the AP to assess AP-side channel availability of the at least one newly-available subchannel prior to initiation of data transmission on the at least one newly-available subchannel.

In Example 32, the subject matter of any one or more of Examples 25-31 optionally include, wherein the instructions further configure the one or more processors to: receive a request-to-send (RTS) frame on at least one mutually-available channel of the at least one newly-available subchannel that is available to both, the STA, and AP in response to the at least one notification, and while receiving the data on the first channel; and send a clear-to-send (CTS) frame on the at least one mutually available channel in response to receiving the RTS frame on the at least one mutually-available channel.

Example 33 is at least one computer-readable storage medium that stores instructions for execution by one or more processors to perform operations for communication by an access point (AP) for a local area wireless network, the operations to configure the one or more processors to: initiate data transmission to a client station (STA) on a first channel comprising at least one subchannel; and during transmission of the data on the first channel: receive at least one notification from the STA indicating channel availability of at least one STA-side newly-available channel from among additional set of one or more subchannels that are distinct from the first channel; in response to receipt of the at least one notification, assess AP-side availability of at least one channel from among the at least one STA-side newly-available channel to determine at least one mutually-available channel; in response to a determination of the at least one mutually-available channel, initiate data transmission to the STA on the at least one mutually-available channel.

In Example 34, the subject matter of Example 33 optionally includes, wherein the instructions are to configure the one or more processors to receive and process the at least one notification to process a control frame sent via full-duplex mode on at least one subchannel of the first channel.

In Example 35, the subject matter of any one or more of Examples 33-34 optionally include, wherein the first channel includes a primary subchannel and a non-primary subchannel, and wherein the instructions are to configure the one or more processors to receive the at least one notification on the primary subchannel.

In Example 36, the subject matter of any one or more of Examples 33-35 optionally include, wherein the instructions are to configure the one or more processors to receive and process the at least one notification to process a clear-to-send (CTS) frame on each of the at least one newly-available subchannel.

In Example 37, the subject matter of any one or more of Examples 33-36 optionally include, wherein the instructions are to configure the one or more processors to receive and process the at least one notification to process a control frame sent via full-duplex mode on at least one subchannel of the first channel, and, subsequently, a clear-to-send (CTS) frame on each of the at least one newly-available subchannel.

In Example 38, the subject matter of Example 37 optionally includes, wherein the clear-to-send (CTS) frame on each of the at least one newly-available subchannel is sent according to a predefined time delay following the control frame.

Example 39 is a method for operating a client station (STA) in a local area wireless network, the method comprising: receiving, by the STA, data sent by an access point (AP) on a first channel comprising at least one subchannel; while receiving the data on the first channel, monitoring, by the STA, channel availability of an additional set of one or more subchannels that are distinct from the first channel; while receiving the data on the first channel, in response to a detected availability of the additional set of one or more subchannels as a result of the monitoring, sending at least one notification, by the STA, to the AP identifying availability of at least one newly-available channel of the additional set; subsequent to sending the at least one notification, and while receiving the data on the first channel, receiving, by the STA, data from the AP on the at least one newly-available subchannel, wherein the data from the AP on the at least one newly-available subchannel is sent in response to the at least one notification.

In Example 40, the subject matter of Example 39 optionally includes, wherein transmission of the data on the first channel is initiated by the AP.

In Example 41, the subject matter of any one or more of Examples 39-40 optionally include, wherein the at least one notification includes a control frame sent via full-duplex mode on at least one subchannel of the first channel.

In Example 42, the subject matter of any one or more of Examples 39-41 optionally include, wherein the first channel includes a primary subchannel and a non-primary subchannel, and wherein the at least one notification is sent on the primary subchannel.

In Example 43, the subject matter of any one or more of Examples 39-42 optionally include, wherein the at least one notification includes a clear-to-send (CTS) frame on each of the at least one newly-available subchannel.

In Example 44, the subject matter of any one or more of Examples 39-43 optionally include, wherein the at least one notification includes a control frame sent via full-duplex mode on at least one subchannel of the first channel, and, subsequently, a clear-to-send (CTS) frame on each of the at least one newly-available subchannel.

In Example 45, the subject matter of Example 44 optionally includes, wherein the clear-to-send (CTS) frame on each of the at least one newly-available subchannel is sent according to a predefined time delay following the control frame.

In Example 46, the subject matter of Example 45 optionally includes, wherein the predefined time delay is to permit the AP to assess AP-side channel availability of the at least one newly-available subchannel prior to initiating data transmission on the at least one newly-available subchannel.

In Example 47, the subject matter of any one or more of Examples 39-46 optionally include, further comprising: in response to sending the at least one notification, and while receiving the data on the first channel, receiving, by the STA, a request-to-send (RTS) frame on at least one mutually-available channel of the at least one newly-available subchannel that is available to both, the STA, and AP; and in response to receiving the RTS frame on the at least one mutually-available channel, sending, by the STA, a clear-to-send (CTS) frame on the at least one mutually available channel.

In Example 48, the subject matter of any one or more of Examples 39-47 optionally include, wherein the additional set of one or more subchannels are contiguous with the first channel.

In Example 49, the subject matter of any one or more of Examples 39-48 optionally include, wherein the additional set of one or more subchannels are noncontiguous with the first channel.

Example 50 is a method for operating an access point station (AP) in a local area wireless network, the method comprising: initiating, by the AP, data transmission to a client station (STA) on a first channel comprising at least one subchannel; and during transmission of the data on the first channel: receiving, by the AP, at least one notification from the STA indicating channel availability of at least one STA-side newly-available channel from among additional set of one or more subchannels that are distinct from the first channel; in response to receipt of the at least one notification, assessing, by the AP, AP-side availability of at least one channel from among the at least one STA-side newly-available channel to determine at least one mutually-available channel; in response to a determination of the at least one mutually-available channel, initiating, via the AP, data transmission to the STA on the at least one mutually-available channel.

In Example 51, the subject matter of Example 50 optionally includes, wherein the at least one notification includes a control frame sent via full-duplex mode on at least one subchannel of the first channel.

In Example 52, the subject matter of any one or more of Examples 50-51 optionally include, wherein the first channel includes a primary subchannel and a non-primary subchannel, and wherein the at least one notification is sent on the primary subchannel.

In Example 53, the subject matter of any one or more of Examples 50-52 optionally include, wherein the at least one notification includes a clear-to-send (CTS) frame on each of the at least one newly-available subchannel.

In Example 54, the subject matter of any one or more of Examples 50-53 optionally include, wherein the at least one notification includes a control frame sent via full-duplex mode on at least one subchannel of the first channel, and, subsequently, a clear-to-send (CTS) frame on each of the at least one newly-available subchannel.

In Example 55, the subject matter of Example 54 optionally includes, wherein the clear-to-send (CTS) frame on each of the at least one newly-available subchannel is sent according to a predefined time delay following the control frame.

In Example 56, the subject matter of any one or more of Examples 50-55 optionally include, wherein the additional set of one or more subchannels are contiguous with the first channel.

In Example 57, the subject matter of any one or more of Examples 50-56 optionally include, wherein the additional set of one or more subchannels are noncontiguous with the first channel.

Example 58 is an access point station (AP) for a local area wireless network, the AP comprising: means for initiating data transmission to a client station (STA) on a first channel comprising at least one subchannel; and means for receiving, during transmission of the data on the first channel, at least one notification from the STA indicating channel availability of at least one STA-side newly-available channel from among additional set of one or more subchannels that are distinct from the first channel; means for assessing, in response to receipt of the at least one notification, and during transmission of the data on the first channel, AP-side availability of at least one channel from among the at least one STA-side newly-available channel to determine at least one mutually-available channel; means for initiating, during transmission of the data on the first channel, and in response to a determination of the at least one mutually-available channel, data transmission to the STA on the at least one mutually-available channel.

In Example 59, the subject matter of Example 58 optionally includes, wherein the at least one notification includes a control frame sent via full-duplex mode on at least one subchannel of the first channel.

In Example 60, the subject matter of any one or more of Examples 58-59 optionally include, wherein the first channel includes a primary subchannel and a non-primary subchannel, and wherein the at least one notification is sent on the primary subchannel.

In Example 61, the subject matter of any one or more of Examples 58-60 optionally include, wherein the at least one notification includes a clear-to-send (CTS) frame on each of the at least one newly-available subchannel.

In Example 62, the subject matter of any one or more of Examples 58-61 optionally include, wherein the at least one notification includes a control frame sent via full-duplex mode on at least one subchannel of the first channel, and, subsequently, a clear-to-send (CTS) frame on each of the at least one newly-available subchannel.

In Example 63, the subject matter of Example 62 optionally includes, wherein the clear-to-send (CTS) frame on each of the at least one newly-available subchannel is sent according to a predefined time delay following the control frame.

In Example 64, the subject matter of any one or more of Examples 58-63 optionally include, wherein the additional set of one or more subchannels are contiguous with the first channel.

In Example 65, the subject matter of any one or more of Examples 58-64 optionally include, wherein the additional set of one or more subchannels are noncontiguous with the first channel.

Example 66 is a client station (STA) for a local area wireless network, the STA comprising: means for receiving data sent by an access point (AP) on a first channel comprising at least one subchannel; means for monitoring, while receiving the data on the first channel, channel availability of an additional set of one or more subchannels that are distinct from the first channel; means for sending, while receiving the data on the first channel, and in response to a detected availability of the additional set of one or more subchannels as a result of the monitoring, at least one notification to the AP identifying availability of at least one newly-available channel of the additional set; means for receiving, subsequent to sending the at least one notification, and while receiving the data on the first channel, data from the AP on the at least one newly-available subchannel, wherein the data from the AP on the at least one newly-available subchannel is sent in response to the at least one notification.

In Example 67, the subject matter of any one or more of Examples 39-66 optionally include, wherein transmission of the data on the first channel is initiated by the AP.

In Example 68, the subject matter of any one or more of Examples 39-67 optionally include, wherein the at least one notification includes a control frame sent via full-duplex mode on at least one subchannel of the first channel.

In Example 69, the subject matter of any one or more of Examples 39-68 optionally include, wherein the first channel includes a primary subchannel and a non-primary subchannel, and wherein the at least one notification is sent on the primary subchannel.

In Example 70, the subject matter of any one or more of Examples 39-69 optionally include, wherein the at least one notification includes a clear-to-send (CTS) frame on each of the at least one newly-available subchannel.

In Example 71, the subject matter of any one or more of Examples 39-70 optionally include, wherein the at least one notification includes a control frame sent via full-duplex mode on at least one subchannel of the first channel, and, subsequently, a clear-to-send (CTS) frame on each of the at least one newly-available subchannel.

In Example 72, the subject matter of any one or more of Examples 44-71 optionally include, wherein the clear-to-send (CTS) frame on each of the at least one newly-available subchannel is sent according to a predefined time delay following the control frame.

In Example 73, the subject matter of any one or more of Examples 45-72 optionally include, wherein the predefined time delay is to permit the AP to assess AP-side channel availability of the at least one newly-available subchannel prior to initiation of data transmission on the at least one newly-available subchannel.

In Example 74, the subject matter of any one or more of Examples 39-73 optionally include, further comprising: means for receiving, in response to sending the at least one notification, and while receiving the data on the first channel, a request-to-send (RTS) frame on at least one mutually-available channel of the at least one newly-available subchannel that is available to both, the STA, and AP; and means for sending, in response to receiving the RTS frame on the at least one mutually-available channel, a clear-to-send (CTS) frame on the at least one mutually available channel.

In Example 75, the subject matter of any one or more of Examples 39-74 optionally include, wherein the additional set of one or more subchannels are contiguous with the first channel.

In Example 76, the subject matter of any one or more of Examples 39-75 optionally include, wherein the additional set of one or more subchannels are noncontiguous with the first channel.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus for a client station (STA), the apparatus comprising transceiver circuitry and hardware processing circuitry, the hardware processing circuitry to configure the transceiver circuitry to:

receive data sent by an access point (AP) on a first channel comprising at least a first subchannel; and during reception of the data on the first subchannel of the first channel:
monitor channel availability of an additional set of one or more sub channels distinct from the first channel;
in response to a detected availability of at least one newly-available subchannel of the additional set, send at least one notification to the AP, via the first subchannel, identifying STA-side availability of the at least one newly-available subchannel;
receive data from the AP on the at least one newly-available subchannel, wherein the data from the AP on the at least one newly-available subchannel is sent in response to the at least one notification.

2. The apparatus of claim 1, wherein transmission of the data on the first channel is initiated by the AP.

3. The apparatus of claim 1, wherein the at least one notification includes a control frame sent via full-duplex mode on the first subchannel of the first channel.

4. The apparatus of claim 1, wherein the first channel includes a primary subchannel and a non-primary subchannel, and wherein the at least one notification is sent on the primary subchannel.

5. The apparatus of claim 1, wherein the at least one notification includes a clear-to-send (CTS) frame on each of the at least one newly-available subchannel.

6. The apparatus of claim 1, wherein the at least one notification includes a control frame sent via full-duplex mode on the first subchannel of the first channel, and, subsequently, a clear-to-send (CTS) frame on each of the at least one newly-available subchannel.

7. The apparatus of claim 6, wherein the clear-to-send (CTS) frame on each of the at least one newly-available subchannel is sent according to a predefined time delay following the control frame.

8. The apparatus of claim 7, wherein the predefined time delay is to permit the AP to assess AP-side channel availability of the at least one newly-available subchannel prior to initiation of data transmission on the at least one newly-available subchannel.

9. The apparatus of claim 1, wherein the hardware processing circuitry further configures the transceiver circuitry to:
in response to sending of the at least one notification, and during reception of the data on the first channel, receive a request-to-send (RTS) frame on at least one mutually-available channel of the at least one newly-available subchannel that is available to both, the client station, and the AP; and
in response to receiving the RTS frame on the at least one mutually-available channel, send a clear-to-send (CTS) frame on the at least one mutually available channel.

10. The apparatus of claim 1, wherein the first channel has a bandwidth equal to a positive integer multiple of a bandwidth of a subchannel.

11. The apparatus of claim 1, wherein each subchannel has a bandwidth of 20 MHz, and wherein the first channel has a variable bandwidth selected from the group consisting of: 20 MHz, 40 MHz, 60 MHz, 80 MHz, 160 MHz.

12. An apparatus for an access point station (AP), the apparatus comprising transceiver circuitry and hardware processing circuitry, the hardware processing circuitry to configure the transceiver circuitry to:
initiate data transmission to a client station (STA) on a first channel comprising at least a first subchannel; and
during transmission of the data on the first subchannel:
receive, via the first subchannel, at least one notification from the STA indicating channel availability of at least one STA-side newly-available channel from among an additional set of one or more subchannels that are distinct from the first channel; and
in response to receipt of the at least one notification, initiate data transmission on one or more of the at least one STA-side newly-available channel.

13. The apparatus of claim 12, wherein the hardware processing circuitry is to further configure the transceiver circuitry to:
in response to the receipt of the at least one notification and prior to initiation of the data transmission on the one or more of the at least one STA-side newly-available channel, assess AP-side availability of at least one mutually-available channel from among the at least one STA-side newly-available channel,
wherein the one or more of the at least one STA-side newly-available channel on which the data transmission is initiated is the at least one mutually-available channel.

14. The apparatus of claim 12, wherein the at least one notification includes a control frame received via full-duplex mode on at least one subchannel of the first channel.

15. The apparatus of claim 12, wherein the first channel includes a primary subchannel and a non-primary subchannel, and wherein the at least one notification is received on the primary subchannel.

16. The apparatus of claim 12, wherein the at least one notification includes a clear-to-send (CTS) frame received on each of the at least one STA-side newly-available subchannel.

17. The apparatus of claim 12, wherein the at least one notification includes a control frame received via full-duplex mode on the first subchannel of the first channel, and, subsequently, a clear-to-send (CTS) frame on each of the at least one STA-side newly-available subchannel.

18. The apparatus of claim 17, wherein the clear-to-send (CTS) frame on each of the at least one STA-side newly-available subchannel is received according to a predefined time delay following the control frame.

19. A non-transitory computer-readable storage medium that stores instructions for execution by one or more processors to perform operations for communication by a client station (STA) for a local area wireless network, the operations to configure the one or more processors to: receive data sent by an access point (AP) on a first channel comprising at least a first one subchannel; and during reception of the data on the first subchannel: monitor channel availability of an additional set of one or more subchannels distinct from the first channel; in response to a detected availability of at least one newly-available subchannel of the additional set, send at least one notification to the AP via the first subchannel identifying STA-side availability of the at least one newly-available subchannel; and receive data from the AP on the at least one newly-available subchannel, wherein the data from the AP on the at least one newly-available subchannel is sent in response to the at least one notification.

20. The non-transitory computer-readable storage medium of claim 19, wherein the instructions are to configure the one or more processors to send the at least one notification that includes a control frame sent via full-duplex mode on at least the first one subchannel of the first channel.

21. The non-transitory computer-readable storage medium of claim 19, wherein the first channel includes a primary subchannel and a non-primary subchannel, and wherein the instructions are to configure the one or more processors to send the at least one notification on the primary subchannel.

22. The non-transitory computer-readable storage medium of claim 19, wherein the instructions are to configure the one or more processors to send the at least one notification to include a clear-to-send (CTS) frame on each of the at least one newly-available subchannel.

23. The non-transitory computer-readable storage medium of claim 19, wherein the instructions are to configure the one or more processors to send the at least one notification to include a control frame sent via full-duplex mode on the first at least one subchannel of the first channel, and, subsequently, a clear-to-send (CTS) frame on each of the at least one newly-available subchannel.

24. The non-transitory computer-readable storage medium of claim 23, wherein the clear-to-send (CTS) frame on each of the at least one newly-available subchannel is sent according to a predefined time delay following the control frame.

25. The non-transitory computer-readable storage medium of claim 19, wherein the instructions further configure the one or more processors to: receive a request-to-send (RTS) frame on at least one mutually-available channel of the at least one newly-available subchannel that is available to both, the STA, and AP in response to the at least one notification, and while receiving the data on the first channel; and send a clear-to-send (CTS) frame on the at least one mutually available channel in response to receiving the RTS frame on the at least one mutually-available channel.

26. A method for operating an access point station (AP) in a local area wireless network, the method comprising:

initiating, by the AP, data transmission to a client station (STA) on a first channel comprising at least a first subchannel; and during transmission of the data on the first subchannel:
    receiving, by the AP, via the first subchannel, at least one notification from the STA indicating channel availability of at least one STA-side newly-available channel from among additional set of one or more subchannels that are distinct from the first channel;
    in response to receipt of the at least one notification, assessing, by the AP, AP-side availability of at least one channel from among the at least one STA-side newly-available channel to determine at least one mutually-available channel; and
    in response to a determination of the at least one mutually-available channel, initiating, via the AP, data transmission to the STA on the at least one mutually-available channel.

27. The method of claim 26, wherein the at least one notification includes a control frame sent via full-duplex mode on the first subchannel of the first channel.

28. The method of claim 26, wherein the first channel includes a primary subchannel and a non-primary subchannel, and wherein the at least one notification is sent on the primary subchannel.

29. The method of claim 26, wherein the at least one notification includes a clear-to-send (CTS) frame on each of the at least one newly-available subchannel.

30. The method of claim 26, wherein the at least one notification includes a control frame sent via full-duplex mode on the first subchannel of the first channel, and, subsequently, a clear-to-send (CTS) frame on each of the at least one newly-available subchannel.

\* \* \* \* \*